United States Patent
Andres et al.

(10) Patent No.: US 8,462,319 B2
(45) Date of Patent: Jun. 11, 2013

(54) APPARATUS AND METHOD FOR DETECTING DEFORMATIONS ON A VEHICLE COMPONENT

(75) Inventors: Thorsten Andres, Paderborn (DE); Bjorn Richter, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 770 days.

(21) Appl. No.: 12/580,639

(22) Filed: Oct. 16, 2009

(65) Prior Publication Data

US 2010/0097597 A1    Apr. 22, 2010

(30) Foreign Application Priority Data

Oct. 17, 2008  (DE) .......................... 10 2008 051 794

(51) Int. Cl.
*G01C 3/08* (2006.01)

(52) U.S. Cl.
USPC ......... 356/4.06; 356/4.01; 356/4.1; 356/5.01; 356/5.1

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS 4,074,128 A  *  2/1978  Harris et al. .................. 250/205
2004/0207261 A1*  10/2004  Pettypiece et al. ............. 307/9.1

FOREIGN PATENT DOCUMENTS

| DE | 3231800 | 3/1984 |
|---|---|---|
| DE | 3834005 | 4/1990 |
| DE | 4015668 | 11/1991 |
| DE | 4224166 | 2/1993 |
| DE | G 92 15 383.6 | 3/1994 |
| DE | 19720531 | 11/1998 |
| DE | 102004007801 | 9/2005 |
| DE | 102004029816 | 1/2006 |
| DE | 102005046928 | 4/2007 |

* cited by examiner

*Primary Examiner* — Luke Ratcliffe
(74) *Attorney, Agent, or Firm* — Henry M. Feiereisen LLC

(57) ABSTRACT

An apparatus and a method for detecting deformations of a vehicle component on a motor vehicle are disclosed, which are capable of unambiguously determining the location and temporal progression of the deformation, as well as the severity of the deformation, within a very short time after the deformation of the vehicle component begins. An emitter unit together with a detector unit is displaced relative to an aperture component disposed on the vehicle component upon deformation of the vehicle component. A beam path of a light beam between the emitter unit and the detector unit is interrupted or opened when the aperture component is displaced relative to the emitter unit, thereby changing an illumination intensity detected by the detector unit. A signal representative of the illumination intensity is transmitted from the detector unit to an evaluation unit.

13 Claims, 2 Drawing Sheets

APPARATUS AND METHOD FOR DETECTING DEFORMATIONS ON A VEHICLE COMPONENT

CROSS-REFERENCES TO RELATED APPLICATIONS

This application claims the priority of German Patent Application, Serial No. 10 2008 051 794.1, filed Oct. 17, 2008, pursuant to 35 U.S.C. 119(a)-(d), the content of which is incorporated herein by reference in its entirety as if fully set forth herein.

This is one of two applications both filed on the same day. Both applications deal with related inventions. They are commonly owned and have the same inventive entity. Both applications are unique, but incorporate the other by reference. Accordingly, the following U.S. patent application is hereby expressly incorporated by reference: "APPARATUS AND METHOD FOR DETECTING DEFORMATIONS ON A VEHICLE COMPONENT".

BACKGROUND OF THE INVENTION

The present invention relates to an apparatus and a method for detecting deformations of vehicle components, in particular on a motor vehicle.

The following discussion of related art is provided to assist the reader in understanding the advantages of the invention, and is not to be construed as an admission that this related art is prior art to this invention.

Detecting motor vehicle accidents is very important for protecting the occupants in order to initiate relevant safety measures, for example, deploying an airbag. German Offenlegungsschrift DE 10 2004 029 816 A1 discloses the provision of acceleration sensors to detect a sudden change in the speed of a motor vehicle. The acceleration sensor hereby reacts purely mechanically to deceleration of a vehicle by, for example, deflecting a seismic mass of the sensor. The electric properties between movable and fixed webs of the sensor thereby change, representing a measure for the magnitude of the acceleration/deceleration.

Disadvantageously, when using central acceleration sensors, for example in the event of a frontal impact, the acceleration force produced at a low speed is not significantly different from the acceleration force produced during the accident at a very high speed during the first 20 to 30 ms. Significant differences are encountered only at times that are greater than 30 ms, because the impact energy at the beginning of the accident is absorbed by the soft basic structure of the crash box. The rest of the body experiences only a slight acceleration/deceleration during that time. In addition, the location of the impact and the intensity of the accident can only be approximately determined.

German Offenlegungsschrift DE 10 2005 046 928 A1 detects an accident by evaluating sound produced by the body, also referred to as Crash Impact Sound Sensing (CISS). When structural components of a motor vehicle are deformed, the generated stress produces micro-fractures in the components, which is associated with the emission of sound waves from the body. Deformations of the vehicle body caused by the accident can then be identified by digitally evaluating the body sound signal. However, it is difficult to select the origin of the impact or the deformation, because the origin of the body sound is also unknown. In addition, a characteristic signal must be present to unambiguously distinguish the accident or the deformation of the vehicle body from other disturbances. This requires separation of the signal from these disturbances, which necessitates a correspondingly high computing power and a computing time of about 15 ms.

It would therefore be desirable and advantageous to obviate prior art shortcomings and to provide an improved apparatus and a method capable of unambiguously identify the location of the deformation of a vehicle component and the temporal progression of the deformation, so that the severity of the accident can be better determined. The evaluation should be performed within a very short timeframe, in particular less than 10 ms, after the crash occurs and should not require complicated computations.

In addition, a motor vehicle with a device for detecting deformations of vehicle components, in particular body components, is disclosed.

SUMMARY OF THE INVENTION

According to one aspect of the invention, an apparatus for detecting a deformation of a vehicle component of a motor vehicle includes a sensor unit with an aperture component which is arranged on a vehicle component, for example, the body, and displaced relative to the emitter and detector unit in the event of a deformation of the vehicle body. The beam paths of the light beams extending from the emitter unit to the detector unit are interrupted when the aperture component is displaced. The detector unit detects the illumination intensity of the impinging light beams and transmits the intensity as a signal, for example a light signal, to a central evaluation unit which evaluates the signals received from one or several such sensor units.

According to another aspect of the invention, a method for detecting a deformation on a vehicle component includes the steps of displacing an emitter component together with a detector component relative to an aperture component disposed on the vehicle component upon deformation of the vehicle component, interrupting or opening a beam path of a light beam between a light emitter unit of the emitter component and a detector unit of the detector component when the aperture component is displaced relative to the emitter component, thereby changing an illumination intensity detected by the detector unit, and transmitting a signal representative of the illumination intensity from the detector unit to an evaluation unit.

In the context of the present invention, the beam path refers to the path on which a light beam emitted by light emitter unit propagates to a detector unit.

The light emitter may be composed of individual emitters, for example diodes, wherein each diode emits a light beam. Alternatively, the light emitter may also have only a single light source, wherein its light beam is divided into several light beams by a pin diaphragm.

The central detector unit may be composed of, for example, optocouplers or individual detectors or be made of a suitable large detector, for example in form of a Charge-Coupled-Device-Sensor (CCD-Sensor).

During a deformation of the vehicle component on which the aperture component is arranged, the aperture component is displaced relative to the emitter and detector unit and sequentially interrupts the individual beam paths. As a result of the interruption, less light impinges on the detector unit, thereby also decreasing the detected illumination intensity.

Alternatively, with a corresponding configuration of the aperture component more light beams may be transmitted when the vehicle body is deformed in the region of the aperture component, so that the illumination intensity detected by the detector unit increases with increasing deformation.

Instead of displacing the aperture component relative to the emitter unit with the detector unit, the emitter unit and detector unit can also be arranged on the deforming component of the motor vehicle or the component absorbing the deformation, whereby in the event of a deformation of a vehicle component the emitter and detector unit move relative to the aperture component.

Progression of the deformations in the vehicle component, for example the vehicle body, can be computed in the evaluation unit from the changes of the detected illumination intensity. The speed of the deformation of the vehicle component can be computed from the change in the illumination intensity over time.

The light beams must here be arranged with a constant mutual spacing and have the same intensity. It is also important that, in particular, when several detectors are used, the emitter unit and the detector unit are arranged parallel to one another. In this way, the diameter of the impinging light beam and hence the intensity distribution is the same on each detector. When the emitter unit is tilted relative to the detector unit, the diameter of the light beam on the detector changes depending on its lengths. The light and hence the actual illumination intensity may then be only partially absorbed by the detector, so that the abrupt signal changes required for evaluation can no longer be unambiguously detected. The abrupt signal changes can be seen in the function of the detected illumination intensity over time in form of steep edges. Each interruption of the individual beam paths through the aperture component decreases the illumination intensity by a constant value, thereby generating the edges between the different values of the illumination intensity. In order to obtained the steepest possible edges, the diameter of the light beams should be as small as possible.

The deformation speed can be determined from the spacing between the edges, and the magnitude of the deformation can be determined from the number of the edges.

The signals received by the detector unit are then transmitted to the evaluation unit. The signals are processed by the evaluation unit and transmitted as input parameters, for example to a control unit capable of activating corresponding safety systems.

The evaluation unit can be implemented as a central node where signals from various sensor units arranged on different vehicle components are merged. The signals from all sensor units can be centrally evaluated in the evaluation unit. In addition, all sensor units can be connected to a central light emitter which can be located in or on the evaluation unit.

For a reliable performance of the sensor, the aperture module must be easily displaceable relative to the emitter component. Jamming can be prevented, for example, by implementing only point-wise or line-wise contact between the modular grid and a guide of the emitter component. Alternatively, partially yielding materials, in particular plastics, may be used to prevent jamming.

Advantageously, with the invention the optical signal received from the evaluation unit can be directly evaluated without first filtering out disturbances.

The sensor units can be attached on or in the motor vehicle wherever necessary. The motor vehicle can hence be provided with a kind of optical network whose signals are merged in the central evaluation unit. The reaction time of the system is composed of the computing time and the time separation between the edges. The elapsed time between the beginning of the deformation and computation of the result used for triggering of, for example, occupant protection systems commensurate with the deformation may be in a range between 1 ms and 2 ms. The reaction time decreases with increasing deformation speed. Optimal protection of the vehicle occupants in the event of an accident is thereby ensured.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
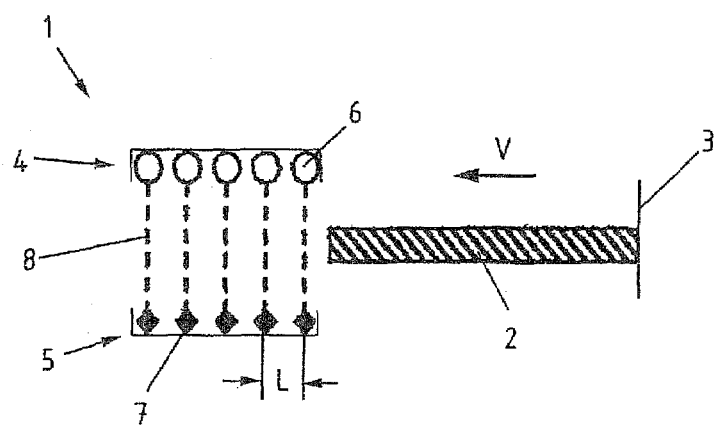
FIG. 1 shows a schematic illustration of one embodiment of a sensor unit according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 3:
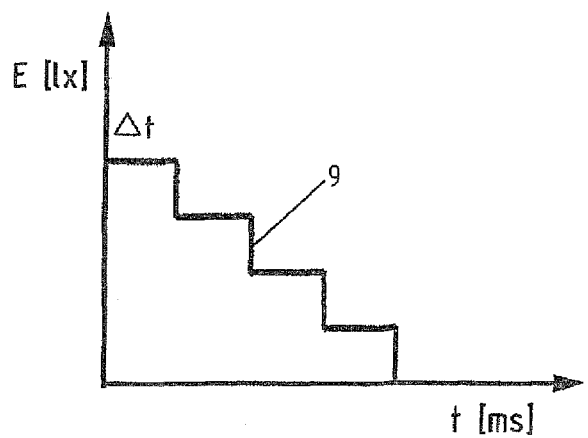
FIG. 3 shows an exemplary graphical illustration of a decrease of illumination intensity over time.

Turning now to the drawing, and in particular to FIG. 1, there is shown a schematic illustration of one embodiment of a sensor unit according to the invention, generally designated by reference numeral 1 and including an aperture component 2 attached on a vehicle component 3, for example a body component. In principle, the evaluation unit can also be arranged on the body. An emitter unit 4 is arranged opposite a detector unit 5. In this embodiment, the emitter unit 4 is composed of several emitters 6, and the detector unit 5 is composed of several detectors 7, so that a single light beam 8 from emitter 6 impinges on a corresponding detector 7. During a deformation V of the vehicle component 3, the aperture component 2 is displaced between the emitter unit 4 and the detector unit 5. The beam paths of the light beams 8 are then sequentially interrupted, producing, for example, a function for the decrease in the illumination intensity E as depicted in FIG. 3. This applies when the individual detectors are connected, for example, via optical light guides. In this case, all beam paths are focused to a point. The illumination intensity E then depends on the number of uninterrupted beam paths.

Alternatively, each detector may operate independently, similar to a photo transistor or a diode and produce a voltage. In this case, transmission to the control unit is electric. Preferably, optical light guides are contemplated for signal transmission, which results in the described functionality in the control unit.

Each interrupted beam path produces in the function a steep edge 9, and the progression of the deformation V of the vehicle component 3 can be detected in the evaluation unit based on the number of edges 9, and the speed of the deformation can be computed from the temporal separation $\Delta t$ of the edges 9.

Figure 2:
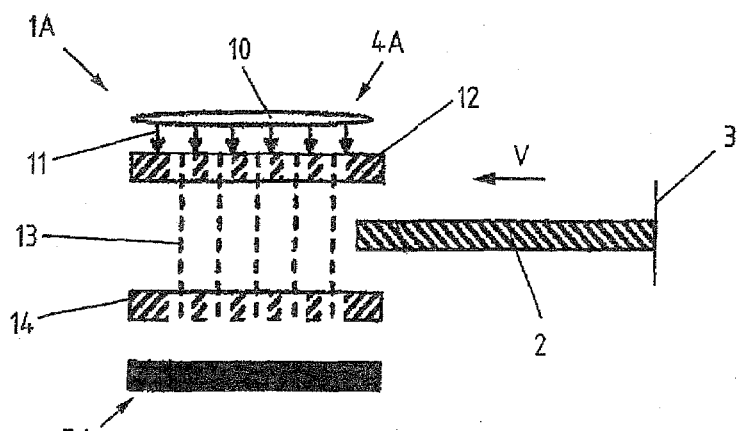
FIG. 2 shows a schematic illustration of another embodiment of a sensor unit according to the invention.

FIG. 2 shows a schematic illustration of another embodiment of a sensor unit according to the invention, generally designated by reference numeral 1A. Parts corresponding with those in FIG. 2 are denoted by identical reference numerals and not explained again. The description below will center on the differences between the embodiments. In this embodiment, the emitter unit 4a has a central light source 10 with a light beam 11 that impinges on a pin diaphragm 12 which divides the light beam 11 into several individual light beams 13 impinging on a central detector unit 5a. As indicated in this example, an additional aperture 14 can be optionally arranged above the detector unit 5a. The aperture component 2 is here once more arranged on a vehicle component 3 and is displaced during the deformation V relative to the emitter unit 4a and the detector unit 5a.

FIG. 3 shows an exemplary graphical illustration of a decrease of illumination intensity E over time t. The function is an example for a unique form displacement of the aperture component relative to the emitter and detector unit and an associated sequential interruption of the individual beam paths.

Figure 4:
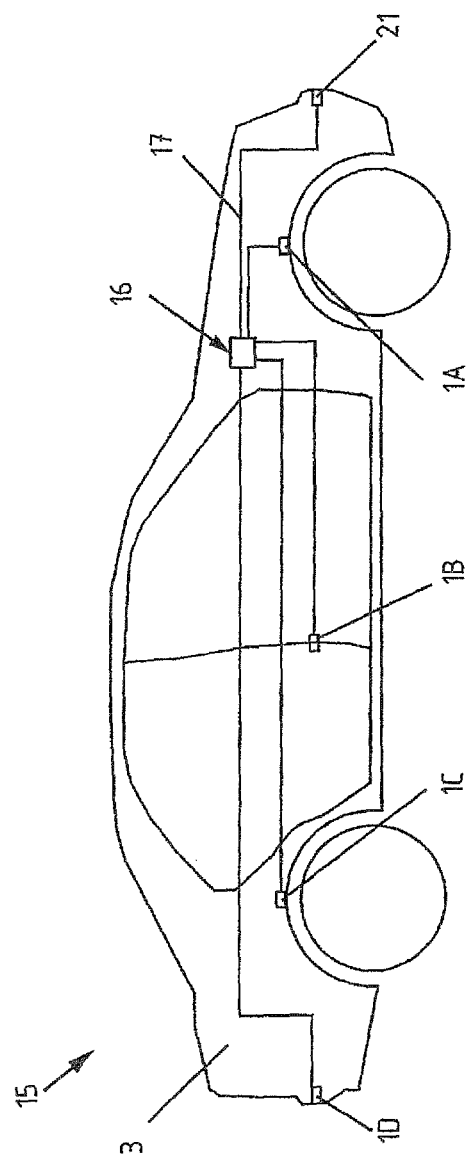
FIG. 4 shows a schematic illustration of a motor vehicle having incorporated therein the subject matter of the present invention.

FIG. 4 shows schematically a motor vehicle 15 with a device for detecting deformations of vehicle components 3. Sensor units 1, 1A, 1B, 1C, 1D are here arranged in different regions of the vehicle components, in particular the body. All sensor units 1, 1A, 1B, 1C, 1D are connected with a central evaluation unit 16. The detected light intensity is transmitted to the evaluation unit 16, for example, through optical light guides 17. The evaluation unit 16 receives simultaneously with the information about the deformation of the vehicle component 3 also information identifying the sensor unit 1, 1A, 1B, 1C, 1D sending the signal, and hence information about the location where the deformation occurs. The central evaluation unit 16 can then also be used to activate corresponding safety systems.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for detecting a deformation on a vehicle component, comprising the steps of:
    displacing an emitter unit together with a detector unit relative to an optically uniformly opaque aperture component disposed on the vehicle component upon deformation of the vehicle component, wherein the emitter unit comprises a plurality of light emitters, each light emitter producing a light beam, and wherein the detector unit comprises a plurality of detectors with the constant mutual spacing therebetween, each detector facing a corresponding emitter, the light emitters having substantially identical intensity and being arranged with a constant mutual spacing therebetween;
    successively blocking or unblocking adjacent beam paths of light beams between light emitters and the corresponding facing detectors when the aperture component is displaced relative to the emitter unit, thereby stepwise increasing or stepwise decreasing an illumination intensity detected by the detector unit; and
    transmitting a signal representative of the illumination intensity from the detector unit to an evaluation unit.

2. The method according to claim 1, wherein the transmitted signal is a time-modulated signal that is transmitted to the evaluation unit in form of a light signal.

3. The method according to claim 1, wherein the evaluation unit associates the signal with a predetermined vehicle component.

4. The method according to claim 1, further comprising the step of computing, in the evaluation unit, progression of the deformation of the vehicle component from a change in the illumination intensity.

5. The method according to claim 1, further comprising the step of computing, in the evaluation unit, a speed of the deformation of the vehicle component from a temporal change in the illumination intensity.

6. The method according to claim 1, further comprising the step of computing in the evaluation unit from the signal transmitted from the detector unit input parameters for a control unit, said control unit capable of activating safety systems.

7. Apparatus for detecting a deformation of a vehicle component of a motor vehicle, comprising:
    a sensor unit having an emitter unit comprising a plurality of light emitters having substantially identical intensity and being arranged with a constant mutual spacing therebetween, each light emitter producing a light beam;
    a detector unit comprising a plurality of detectors with the constant mutual spacing therebetween, each detector facing a corresponding emitter;
    a central evaluation unit connected to the detector unit; and
    an optically uniformly opaque aperture component arranged on a vehicle component,
    wherein the aperture component and the emitter unit with the detector unit are movable in relation to one another, said aperture component at least partially interposed between the emitter unit and the detector unit and successively blocking or unblocking adjacent beam paths of light beams between light emitters and the corresponding facing detectors when the aperture component is displaced relative to the emitter unit, thereby stepwise increasing or stepwise decreasing an illumination intensity detected by the detector unit.

8. The apparatus according to claim 7, wherein the emitter unit comprises a pin diaphragm producing the plurality of light beams.

9. The apparatus according to claim 7, wherein the detector unit and the emitter unit are arranged parallel to one another.

10. The apparatus according to claim 7, wherein the detector unit comprises optocouplers.

11. The apparatus according to claim 7, wherein the detector unit comprises a Charge-Coupled-Device (CCD) sensor.

12. The apparatus according to claim 7, wherein the detector unit is connected with the central evaluation unit via an optical light guide.

13. A motor vehicle, comprising an apparatus for detecting a deformation of a vehicle component of a motor vehicle, said apparatus comprising:
    a sensor unit having an emitter unit comprising a plurality of light emitters having substantially identical intensity and being arranged with a constant mutual spacing therebetween, each light emitter producing a light beam;
    a detector unit comprising a plurality of detectors with the constant mutual spacing therebetween, each detector facing a corresponding emitter;
    a central evaluation unit connected to the detector unit; and an optically uniformly opaque aperture component arranged on a vehicle component, wherein the aperture component and the emitter unit with the detector unit are movable in relation to one another, said aperture component at least Partially interposed between the emitter unit and the detector unit and successively blocking or unblocking adjacent beam paths of light beams between light emitters and the corresponding facing detectors when the aperture component is displaced relative to the emitter unit, thereby stepwise increasing or stepwise decreasing an illumination intensity detected by the detector unit.

* * * * *